Aug. 13, 1963
F. B. BURT ETAL
3,100,550
POWER STEERING MECHANISM
Filed Dec. 13, 1960
3 Sheets-Sheet 1
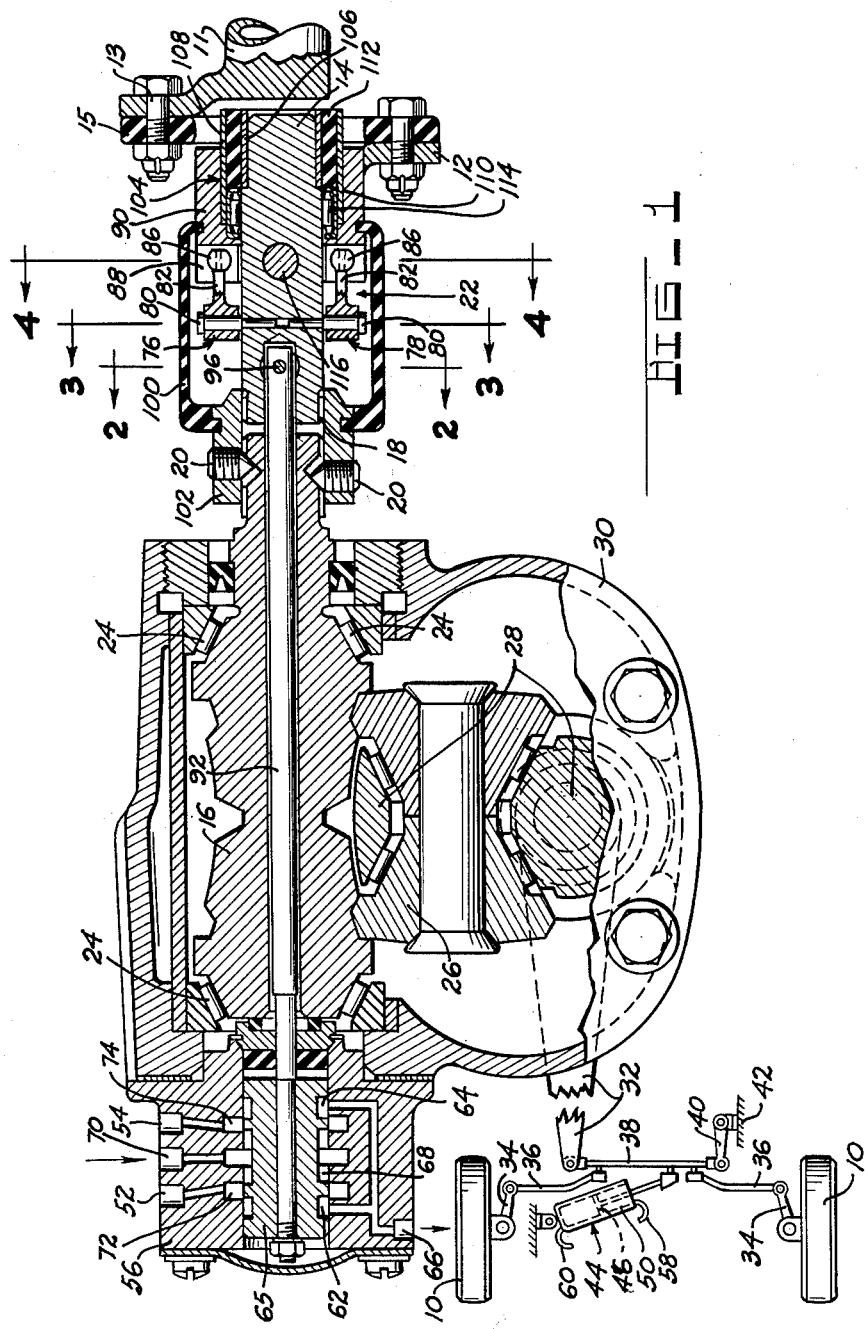
INVENTORS
**FARLOW B. BURT.
JAMES L. VICKERS.**
BY
*William N. Antonis*
ATTORNEY.

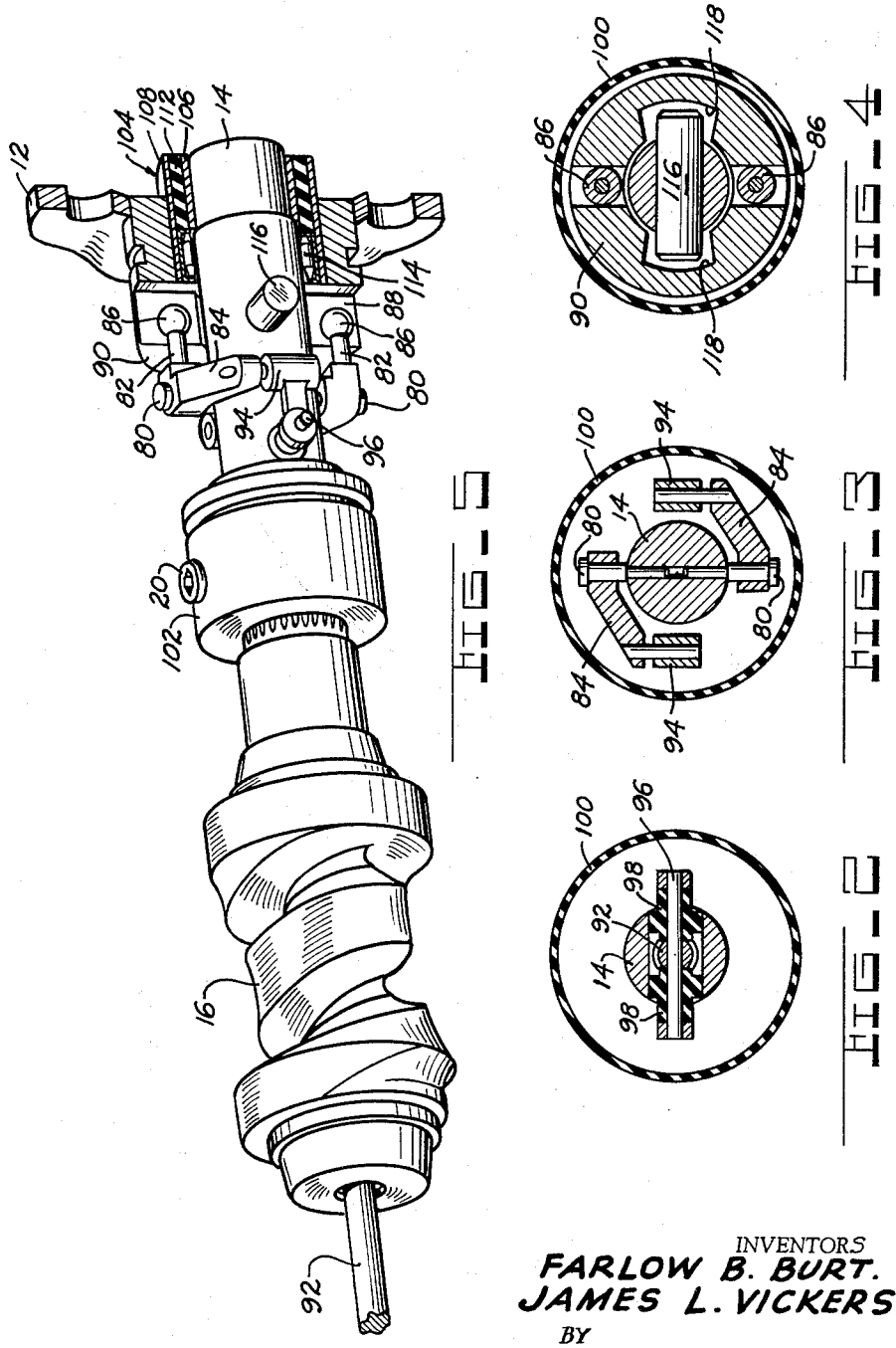

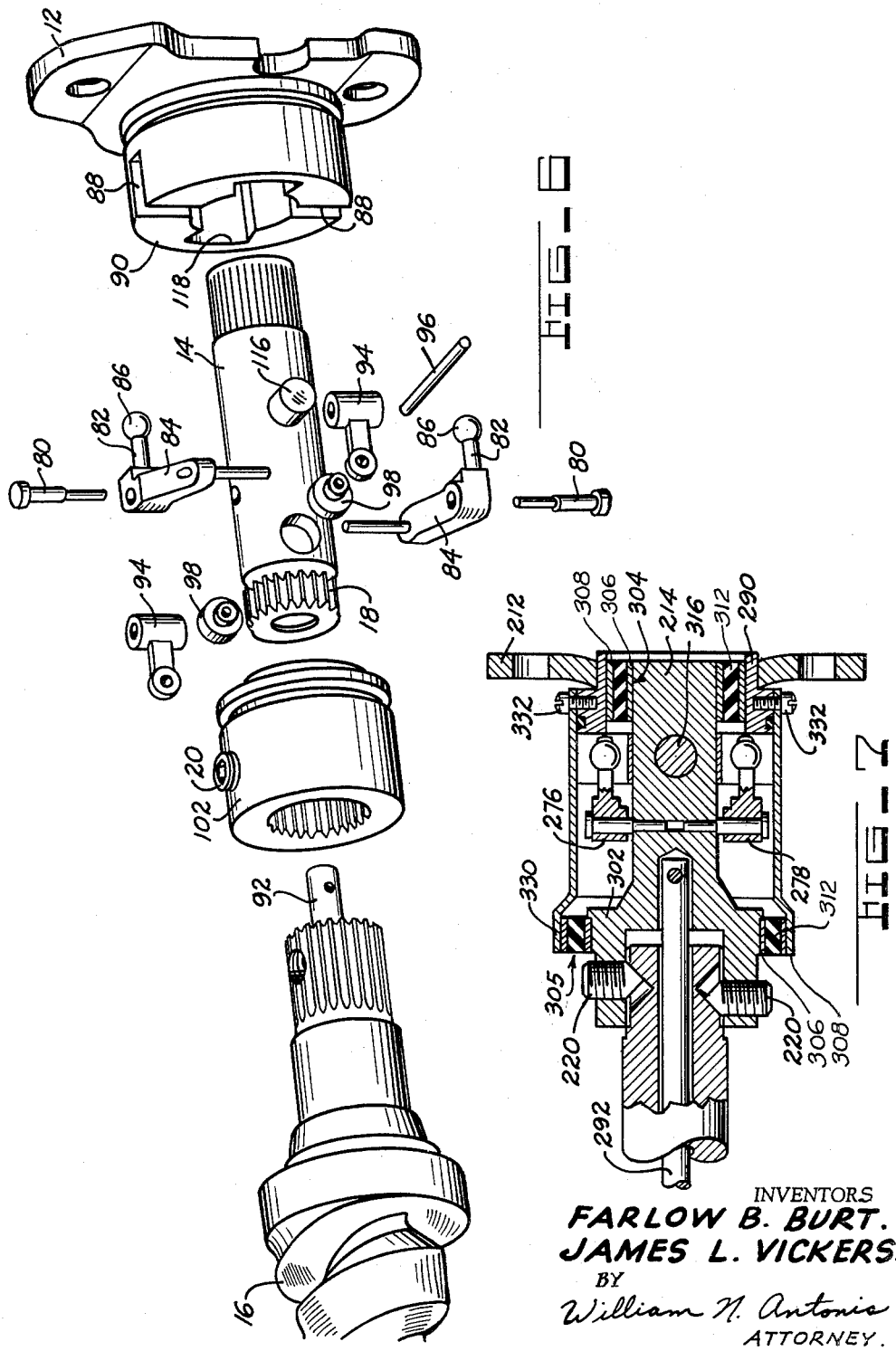

3,100,550
POWER STEERING MECHANISM
Farlow B. Burt and James L. Vickers, South Bend, Ind., assignors to The Bendix Corporation, South Bend, Ind., a corporation of Delaware
Filed Dec. 13, 1960, Ser. No. 75,626
3 Claims. (Cl. 180—79.2)

This invention relates to power steering and more specifically to a valve actuating and "feel" transmitting mechanism therefor.

A primary object of this invention is to provide a simple functionally improved bell crank valve actuating and "feel" transmitting mechanism located between the steering gear and the steering wheel which can be more easily assembled than previous actuators of this general type.

A further object of this invention is to provide mechanical means for creating adequate synthetic "feel" under all types of steering conditions.

A still further object of this invention is to utilize means for providing synthetic "feel" which will also aid in valve dampening and serve as a noise insulator between worm and input shafts.

More specifically, it is an object of this invention to provide adequate synthetic steering "feel" and improve returnability through use of a rubber bushing wherein the rubber is suitably bonded to inner and outer concentric sleeves so that in the neutral position the rubber will always be under tension.

Another object of this invention is to provide a power steering actuator arrangement utilizing such a rubber bushing not only for providing torsional "feel" but also for resisting endwise motion and serving as a thrust bearing for taking thrust loads on the input shaft of the actuator.

A further object of this invention is to provide means between the bell crank actuator and the spool valve for eliminating backlash to the spool and for eliminating spool chatter.

A still further object of this invention is to provide positive means for manual steering in the event of power failure.

The above and other objects and features of this invention will be apparent from the following description of the mechanism taken in connection with the accompanying drawings which form a part of this specification and in which:

FIGURE 1 is a sectional view of a power steering unit, constructed in accordance with the present invention, which is shown in association with parts of a vehicle drawn schematically;

FIGURE 2 is a sectional view taken along line 2—2 of FIGURE 1;

FIGURE 3 is a sectional view taken along line 3—3 of FIGURE 1;

FIGURE 4 is a sectional view taken along line 4—4 of FIGURE 1;

FIGURE 5 is a diametric view of the valve actuating mechanism shown in FIGURE 1 with portions broken away for clarity;

FIGURE 6 is an exploded view of the mechanism shown in FIGURE 5;

FIGURE 7 is a sectional view of a modified version of the actuator shown in FIGURE 1.

Referring to FIGURE 1, it will be seen that reference numeral 10 designates the front wheels of the vehicle to be steered by rotation of a steering shaft 11 which is suitably connected to steering collar 12 by means such as bolts 13, said connection including a flexible coupling member 15 interposed between the steering shaft and steering collar. A shaft section 14, which is fixedly connected to worm 16 through means such as splines 18 and set screws 20, is drivably connected to the steering collar 12 by means of a control assembly indicated generally by numeral 22. The shaft section and worm are held against axial displacement by thrust bearings 24 located at each end of the worm. A roller sector gear 26 is arranged in meshing relationship with the worm and is carried by one end of a sector shaft 28 which is suitably journaled in the housing 30. A pitman arm 32 is connected to the other end of sector shaft 28 and to the spindle arms 34 of the wheels 10 through a steering linkage assembly which includes tie rods 36, a cross tie rod 38, and an idler arm 40, suitably pivoted at one end to the vehicle frame 42.

The hydraulic system of the steering gear includes a fluid motor 44, which is connected between the cross tie rod 38 and the vehicle frame 42. The piston 46 divides the cylinder 50 into opposed chambers constantly communicating respectively with cylinder ports 52 and 54 of valve 56, via conduits 58 and 60. The valve, which is of conventional construction, is suitably attached to the end of the gear housing and includes two annular grooves 62 and 64 in valve spool 65, which communicate with the reservoir (not shown) via return port 66, and a third annular groove 68, which communicates with a pump (not shown) via inlet port 70. The valve body is provided with two annular grooves 72 and 74 which communicate with cylinder ports 52 and 54, respectively, and which overlap the grooves in the valve spool to provide open passages to the valve when the spool is in neutral position.

Valve actuation is provided through means of the control assembly 22, which includes a pair of bell cranks 76 and 78. Each of the bell cranks are pivotally connected to shaft section 14 through means of pins 80, which are a tight fit with respect to the shaft section 14, but a loose fit with respect to the bell crank levers. The pivotal connections of the bell crank levers, which constitute the fulcrum point of the levers, have an axis substantially perpendicular to the axis of the shaft section 14. Each of the bell crank levers has two arms 82 and 84, which extend from the pivotal connection, one of which is operatively connected to steering collar 12 through means of a ball stud 86 formed on the end of arm 82, which is received in slot 88 cut in steering collar extension 90. The other arm 84 is operatively connected to actuating rod 92, which in turn, is suitably connected to valve spool 65, through means of T-shaped connecting members 94 and pin 96 as shown in FIGURES 2, 5, and 6. It will be noted in FIGURE 2 that a pair of rubber snubbers 98 surround the pin 96 in order to eliminate backlash to the spool and to eliminate spool chatter. A boot 100 is operatively connected to steering collar extension 90 and member 102 to keep contaminants away from the control assembly and for containing any lubricant which may be utilized in connection with the control assembly.

Mechanical "feel" is provided through means of a rubber bushing 104. The rubber bushing includes an inner sleeve 106, which is press fit onto the end of shaft section 14, and an outer sleeve 108 which is press fit into a bore 110 formed in steering collar extension 90. The rubber material 112 is suitably bonded to the inner and outer sleeves so that under normal operating conditions the rubber is under tension, even when in a neutral position, that is, when no torsional forces are being exerted thereon. Such a rubber bushing will provide torsional "feel" and is capable of taking axial and/or radial loads. Although a needle bearing 114 is shown in conjunction with rubber bushing 104 in FIGURES 1 and 5, such a bearing is not actually needed. The rubber bushing described also aids in valve dampening, and serves as a noise insulator between the worm and input shafts.

Limited relative movement between the steering collar 12 and shaft section 14 is provided by the pin and slot arrangement shown in FIGURE 4, wherein the pin 116 is fixedly connected to shaft section 14, and the slots 118 are formed in steering collar extension 90. In the event of power failure, manual steering is available once the walls of slots 118 contact the pin 116.

The above described steering mechanism operates in the following manner: Upon initial turning of steering shaft 11 and steering collar 12, a certain amount of steering force is transmitted directly to shaft section 14 through the bonded rubber bushing 104. The rubber bushing 104, which will begin to torsionally deform upon any slight rotational movement of steering collar 12 with respect to shaft section 14, capable of transmitting rotational forces from the steering collar 12 to shaft section 14 in proportion to the degree of its torsional deformation. At the slightest amount of relative rotation between the steering collar 12 and the shaft section 14, the bell crank levers 76 and 78 will begin to pivot about pins 80 thereby causing immediate axial movement of actuating rod 92 which is connected to valve spool 65, but no power boost will result until axial movement of the actuating rod has moved the valve spool to a cut-off position which will result in increased pressurization of one or the other of the power cylinder chambers. Thus, rotational movement of the steering shaft in a clockwise direction (looking at FIGURES 1 and 5 from the right) will cause the actuating rod 92 and valve spool 65 to move from their neutral positions to the right until the valve spool reaches a cut-off position at which time increased fluid pressure will be directed from the inlet port 70 to the appropriate end of power cylinder 50 via cylinder port 54. Rotational movement of the steering collar in a counterclockwise direction will cause movement of the actuating rod and valve spool to the left. This will result in the directing of increased fluid pressure from inlet port 70 to the opposite end of power cylinder 50 via cylinder port 52.

Through means of the bonded rubber bushing and bell crank arrangement disclosed, it is possible not only to achieve a relatively direct actuation of a power steering control valve through rotation of the steering shaft, but also to transmit to the driver a relatively accurate and true "feel" of the road. Thus, in the disclosed power steering mechanism, a hydraulic assist is provided only at such times as when the resistance to movement of the steering linkage exceeds the rotational forces which can be transmitted by the bonded rubber bushing without valve closure, that is, without the valve spool being moved to a cut-off position which will result in pressurization of one side or the other of the power cylinder. If the steering linkage does not exert enough resistance to torsionally deform a bonded rubber bushing and cause relative rotation between the steering collar extension and shaft section 14, then only the manually exerted force at the steering wheel will be necessary to cause movement of the steering linkage, and no hydraulic assist will result. In this manner, synthetic "feel" is transmitted to the driver from the very beginning and under all driving conditions.

It should be noted that the set screws 20, 20 are arranged so that the valve spool 65 can be easily centered or trimmed.

FIGURE 7 shows another embodiment of our actuating mechanism which may be incorporated in the power steering unit shown in FIGURE 1. In this figure, like parts are designated by like numbers plus 200. The FIGURE 7 embodiment is the same in essentially all respects with the FIGURE 1 embodiment, except for the fact that two bonded rubber bushings are incorporated for providing "feel." It, therefore, will be noted that one of the rubber bushings 304 is press fit between shaft section 214 and the steering collar extension 290. The other rubber bushing 305 is press fit between portion 302, which in this instance is an extension of shaft section 214, and a tubular member 330, which is suitably connected to the steering collar extension 290 by means such as screws 332. It will be noted that each of the rubber bushings 304 and 305 include an inner sleeve 306, an outer sleeve 308, and rubber material 312 which is suitably bonded to the inner and outer sleeves. Such a double rubber bushing arrangement will provide "feel" and centering for the actuator in a manner similar to that which has been described in connection with FIGURE 1. This arrangement will, however, provide a double bearing support effect which will take both axial and radial loads. No needle bearings need be incorporated therewith, and the bushings will also seal the actuator from the atmosphere and will confine any lubricant which may be utilized in connection with the control assembly.

The several practical advantages which flow from our invention are believed to be obvious from the above description, and other advantages may suggest themselves to those who are familiar with the art to which the invention relates.

Furthermore, although this invention has been described in connection with certain specific embodiments, it will be obvious to those skilled in the art that various changes may be made in the form, structure, and arrangement of parts without departing from the spirit of the invention. Accordingly, applicants do not desire to be limited to the specific embodiments disclosed herein primarily for purposes of illustration, but instead desire protection falling within the scope of the appended claims.

Having thus described the various features of the invention, what we claim as new and desire to secure by Letters Patent is:

1. In a power steering mechanism having steering means, a power cylinder connected to said steering means, and a valve for controlling the operation of said power cylinder, a valve actuating mechanism comprising a steering shaft, a driven shaft coaxial with said steering shaft and operatively connected to said steering means, means for permitting limited relative rotary motion between said shafts, a member axially movable with respect to said shafts, said member being operatively connected to one of said shafts and to said valve for actuation thereof, a steering collar concentric with said driven shaft and operatively connected to said steering shaft, a bell crank lever for causing axial movement of said member in one direction upon clockwise rotation of said steering shaft and in the opposite direction upon counterclockwise rotation of said steering shaft, said bell crank lever being pivotally connected to said driven shaft and having two arms extending from said pivotal connection, one of said arms being operatively connected to said member and the other of said arms being operatively connected to said steering collar, a tubular member enveloping said bell crank lever and fixedly connected to said steering collar, and first and second resilient bushings for torsionally opposing relative rotation between said steering and driven shafts and for withstanding axial and radial bearing loads, said first bushing being located above said bell crank lever and including a first sleeve fixedly connected to said steering collar, a second sleeve fixedly connected to said driven shaft and a rubber-like material located between and bonded to said sleeves so as to be in tension under all steering conditions, said second bushing being located below said bell crank lever and including a first sleeve fixedly connected to said tubular member, a second sleeve fixedly connected to said driven shaft, and a rubber-like material located between and bonded to said sleeves so as to be in tension under all steering conditions.

2. In a power steering mechanism having steering means, a power cylinder connected to said steering means, and a valve for controlling the operation of said power cylinder, a valve actuating mechanism comprising a steering shaft, a driven shaft having an axially extending bore located therein and a cross bore intersecting said first named bore, said driven shaft being coaxial with said steering shaft and being operatively connected to said steering means, means for permitting limited relative rotary motion between said shafts, a rod located in said axially extending bore and axially movable with respect to said shafts, said rod having one end thereof operatively connected to said valve for actuation thereof, a pin located in said cross bore and fixedly connected to said rod, resilient means located between said pin and the walls of said cross bore, a steering collar concentric with said driven shaft and operatively connected to said steering shaft, a ball crank lever for causing axial movement of said rod in one direction upon clockwise rotation of said steering shaft and in the opposite direction upon counterclockwise rotation of said steering shaft, said bell crank lever being pivotally connected to said driven shaft and having two arms extending from said pivotal connection, one of said arms being operatively connected to said pin and the other of said arms being operatively connected to said steering collar, and a resilient bushing operatively connected to said steering collar and to said driven shaft for torsionally opposing relative rotation therebetween and for withstanding axial and radial bearing loads therebetween, said resilient bushing including a first sleeve fixedly connected to said steering collar, a second sleeve fixedly connected to said driven shaft, and a rubber-like material located between and bonded to said sleeves so as to be in tension under all steering conditions.

3. In a power steering mechanism having steering means, a power motor connected to said steering means, and a valve for controlling the operation of said power motor, a valve actuating mechanism comprising a steering shaft, a driven shaft coaxial with said steering shaft and operatively connected to said steering means, means for permitting limited relative rotary motion between said shafts, a member axially movable with respect to said shafts, said member being operatively connected to one of said shafts and to said valve for actuation thereof, a steering collar concentric with said driven shaft and operatively connected to said steering shaft, actuating means operatively connected to said member and to the other of said shafts for causing axial movement of said member in one direction upon clockwise rotation of said steering shaft and in the opposite direction upon counterclockwise rotation of said steering shaft, a tubular member enveloping said actuating means and fixedly connected to said steering collar, and first and second resilient bushings for torsionally opposing relative rotation between said steering and driven shafts and for withstanding axial and radial bearing loads, said first bushing being located above said actuating means and including a first sleeve fixedly connected to said steering collar, a second sleeve fixedly connected to said driven shaft and a rubber-like material located between and bonded to said sleeves so as to be in tension under all steering conditions, said second bushing being located below said actuating means and including a first sleeve fixedly connected to said tubular member, a second sleeve fixedly connected to said driven shaft, and a rubber-like material located between and bonded to said sleeves so as to be in tension under all steering conditions.

References Cited in the file of this patent

UNITED STATES PATENTS

| | | |
|---|---|---|
| 2,272,900 | Sauer | Feb. 10, 1942 |
| 2,362,930 | Robbins | Nov. 14, 1944 |
| 2,775,132 | Orr et al. | Dec. 25, 1956 |
| 2,930,359 | MacDuff | Mar. 29, 1960 |
| 2,935,150 | Smith et al. | May 3, 1960 |